United States Patent [19]

Akutsu et al.

[11] Patent Number: 4,764,436
[45] Date of Patent: Aug. 16, 1988

[54] IRON-OXYGEN BASED PERPENDICULAR MAGNETIZED ANISOTROPIC THIN FILM

[75] Inventors: Nakao Akutsu; Masako Akimitsu; Tadashi Mizoguchi, all of Tokyo, Japan

[73] Assignee: Research Development Corporation of Japan, Tokyo, Japan; a part interest

[21] Appl. No.: 863,909

[22] Filed: May 16, 1986

[30] Foreign Application Priority Data

May 20, 1985 [JP] Japan .................................. 60-107591
Mar. 13, 1986 [JP] Japan .................................. 61-55484

[51] Int. Cl.$^4$ ........................ H01F 10/00; H01F 10/18
[52] U.S. Cl. ................................ 428/694; 252/62.58; 252/62.59; 428/900
[58] Field of Search ........................ 428/694, 900; 252/62.58, 62.59

[56] References Cited

U.S. PATENT DOCUMENTS

| | | | |
|---|---|---|---|
| 3,638,207 | 1/1972 | Smith et al. | 252/62.58 |
| 3,770,639 | 11/1973 | Okazaki et al. | 252/62.57 |
| 4,232,071 | 11/1980 | Terada et al. | 428/900 |
| 4,562,105 | 12/1985 | Machida et al. | 428/215 |
| 4,586,092 | 4/1986 | Martens et al. | 360/59 |

FOREIGN PATENT DOCUMENTS

| | | |
|---|---|---|
| 3413086 | 11/1984 | Fed. Rep. of Germany . |
| 3503996 | 8/1985 | Fed. Rep. of Germany . |
| 23677 | 6/1974 | Japan . |
| 38919 | 10/1974 | Japan . |
| 218807 | 11/1985 | Japan . |
| 136683 | 6/1986 | Japan . |

OTHER PUBLICATIONS

Kobayashi et al., "Magnetic and Structural Properties of Rh Substituted Co-Cr Alloy Films With Perpendicular Magnetic Ansotropy", J. Appl. Phys. 52(3), Mar. 1981, p. 2453.

Hattori et al., "Magnetic Recording Characteristics of Sputtered $\gamma$-Fe$_2$O$_3$ Thin Film Disks", IEEE Trans or Mag. MAG-15, No. 6, Nov. 1979, p. 1549.

Primary Examiner—George F. Lesmes
Assistant Examiner—William M. Atkinson
Attorney, Agent, or Firm—Armstrong, Nikaido, Marmelstein & Kubovcik

[57] ABSTRACT

A thin film according to the present invention which is disclosed herein is an iron and oxygen based perpendicular magnetized anisotropic thin film useful as a magnetic recording material. This thin film has an excellent magnetic anisotropy in the perpendicular direction to the surface thereof and comprises iron (Fe)-oxygen(O) system, and tin (Sn) and/or germanium (Ge) or aluminum (Al) as a third element. The specified examples of such thin films include those having the composition represented by (I) Fe$_x$O$_y$M$_z$ wherein M represents Sn and/or Ge, and (II) Fe$_x$O$_y$Al$_z$.

The thin film has characteristics optimum as a uniform perpendicular magnetic recording medium, thus making it possible to provide a fine and high-density recording.

4 Claims, 7 Drawing Sheets

Ms = 50 emu/g    Hc = 720 Öe

Mr″/Mr⊥ = 0.42    t = 1.7 μm

[Fe 0.458  O 0.454  Sn 0.088]

Ms = 49 emu/g     Hc = 1120 Oe

Mr$_\parallel$/Mr$_\perp$ = 0.09     t = 2.2 μm

[Fe$_{0.408}$ O$_{0.425}$ Ge$_{0.167}$]

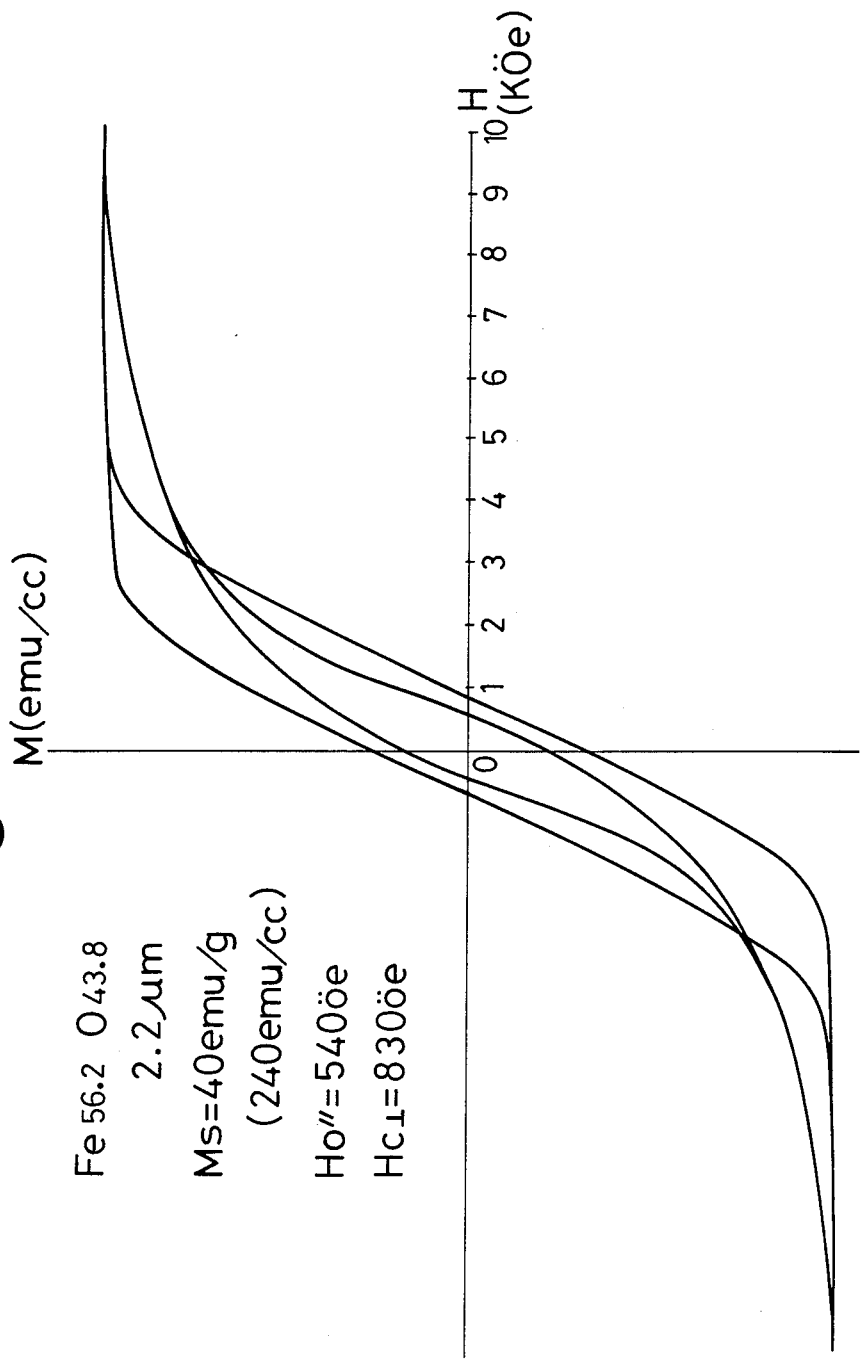

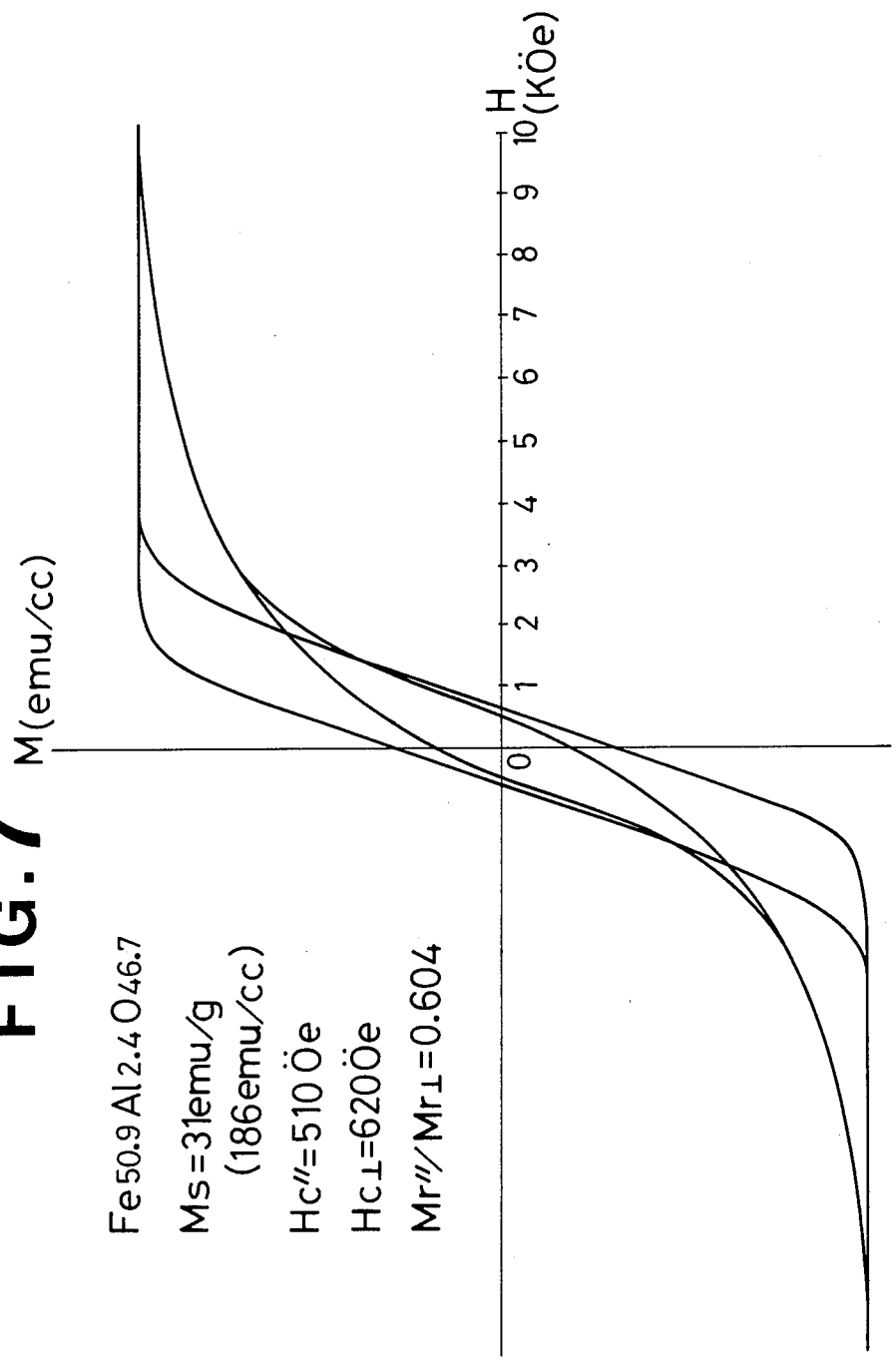

IRON-OXYGEN BASED PERPENDICULAR MAGNETIZED ANISOTROPIC THIN FILM

FIELD OF THE INVENTION

This invention relates to a magnetic thin film and, more particularly, to a magnetic thin film having an excellent magnetic anisotropy in the perpendicular direction to the surface thereof and suitable as a perpendicular magnetic recording medium.

BACKGROUND OF THE INVENTION

One of current magnetization recording methods which are generally adopted is an in-plane magnetization recording method used for coated and deposited-type magnetic recording media. This method involves magnetizing an information to be recorded in an in-plane direction in a plane on the surface of a magnetic recording medium by a magnetic head to record it, but has a limit in recording density in principle because of the magnetization recording in a plane.

On the other hand, there has been extensive development of a perpendicular magnetization recording method which enables the increase in recording density in principle. This method is contemplated to enable the recording with a ultra-high density by the combination of an vertical head with a medium having a perpendicular magnetic anisotropy, and recently, the applications thereof are not only to floppy disks but also to hard disks.

Representive magnetic thin films as a recording medium for use in the above perpendicular magnetization recording method include thin films of a Co-Cr based alloy and Ba ferrite. However, the former thin film of a Co-Cr alloy is accompanied by problems of a wear resistance and an expensiveness because it contains Co and Cr which are a relatively expensive element, respectively, and of an unstability in the supply of these elements as starting materials. On the other hand, with the thin film of Ba ferrite, thin film making conditions are severe in the production of a crystal having a high orientation closely associated with a perpendicular magnetic anisotropy, and it is necessary to heat a substrate to a temperature of 500° C. or more, resulting in a complicated procedure, a limited type of substrate material and an impossibility of using an inexpensive resinous substrate such as PET.

In this way, it is the existing circumstance that the thin films of Co-Cr based alloy and Ba ferrite have a number of industrial problems for recording media and that a novel material recording medium is strongly desired.

OBJECT OF THE INVENTION

It is an object of the present invention to provide a magnetic thin film having an excellent perpendicular magnetic anisotropy, in which the aforesaid disadvantages found in the prior art are overcome, and which can be easily produced with a reduced cost of material.

SUMMARY OF THE INVENTION

According to the present invention, the above object is accomplished by providing an iron and oxygen based perpendicular magnetized anisotropic thin film having an excellent magnetic anisotropy in the perpendicular direction to the surface thereof, which comprises iron (Fe) and oxygen (O).

More particularly, a magnetic thin film having an excellent magnetic anisotropy in the perpendicular direction to the surface thereof according to the present invention has the following compositions (I) or (II):

$$Fe_xO_yM_z \qquad (I)$$

wherein M represents one or two of tin and germanium; and x, y and z each represent a proportion of atom, with a proviso that
$0.25 \leq x \leq 0.6$,
$0.3 \leq y \leq 0.6$ and
$0.005 \leq z \leq 0.3$.

$$Fe_xO_yAl_z \qquad (II)$$

wherein x, y and z each represent a proportion of atom, with a proviso that
$0.4 \leq x \leq 0.6$,
$0.38 \leq y \leq 0.52$ and
$0 \leq z \leq 0.11$.

Further, according to the present invention, there is provided a magnetic thin film which is perpendicularly magnetized and has the composition (I) wherein x, y and z is as follows:
$0.25 \leq x \leq 0.53$,
$0.35 \leq y \leq 0.6$ and
$0.015 \leq z \leq 0.25$.

Yet further, according to the present invention, there is provided a magnetic film which has a magnetic anisotropy with a magnetic anisotropy field of 3 kOe or more in the perpendicular direction to the surface thereof, or a perpendicular magnetic anisotropy with a magnetic anisotropy field exceeding a demagnetization field of the film, in the perpendicular direction to the surface thereof, and has the composition (II) wherein x, y and z may be as follows:
$0.4 \leq x \leq 0.59$
$0.41 \leq y \leq 0.52$ and
$0 \leq z \leq 0.08$

BRIEF DESCRIPTION OF THE DRAWINGS

FIGS. 6 and 7 are diagrams illustrating magnetization curves for magnetic thin films having compositions of $Fe_{0.562}O_{0.438}$ and $Fe_{0.509}Al_{0.024}O_{0.467}$ according to one embodiment of the present invention, respectively, the magnetization curves being measured by a sample vibration-type magnetometer, wherein shown in these figure are a saturation magnetization (Ms), a coercive force (Hc), a ratio (Mr $\parallel$ /Mr $\perp$) of remaining magnetization in plane to remaining magnetization as perpendicularly magnetized, and a thickness, respectively, and the composition of the thin films are quantitatively analyzed by EPMA.

DETAILED DISCLOSURE OF THE INVENTION

For the purpose of accomplishing the object of the present invention, the present inventors, in view of the fact that the above disadvantages associated with the prior art perpendicular magnetized anisotropic thin film are due to the severe condition of production and the use of an expensive material, have made various fundamental experiments to overcome these disadvantages so as to find out a magnetic thin film which as an excellent perpendicular magnetic anisotropy, and which comprises iron-oxygen system, or iron-oxygen system as a predominant components and an optional third element added therein.

More specifically, samples were produced in an RF bipolar sputtering process by way of examples of such magnetic thin films comprising iron and oxygen, and additionally containing tin (Sn), germanium (Ge) and aluminum (Al). In this case, use was made of composite targets comprising a base target made of $Fe_2O_3$ or Fe and sheet or pellet placed on thereon and made of one to three component(s) selected from the group consisting of sintered pellets such as Fe, Ge, $GeO_2$, $SnO_2$, SnO, Al, $Al_2O_3$ and $Fe_3O_4$, and the variation in composition was provided by the combination of the composite targets. In addition, used as a substrate was a Pyrex glass cooled with water under an argon pressure of 2 Pa and at an electrode voltage of 1.5 kV.

Figure 3:
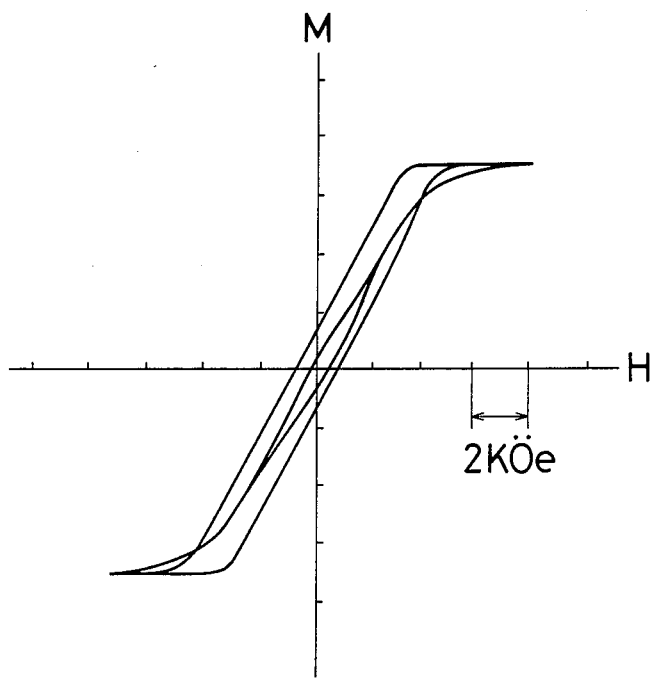
FIGS. 3 and 4 are diagrams illustrating magnetization curves for magnetic thin films having compositions of $Fe_{0.458}O_{0.454}Sn_{0.088}$ and $Fe_{0.408}O_{0.425}Ge_{0.167}$ according to one embodiment of the present invention, respectively, the magnetization curves being measured by a sample vibration-type magnetometer, wherein shown in these figures are a saturation magnetization (Ms), a coercive force (Hc), a ratio (Mr $\parallel$/Mr $\perp$) of remaining magnetization as perpendicularly magnetized, and a thickness, respectively, and the compositions of the thin films are quantitatively analyzed by EPMA.
Figure 4:
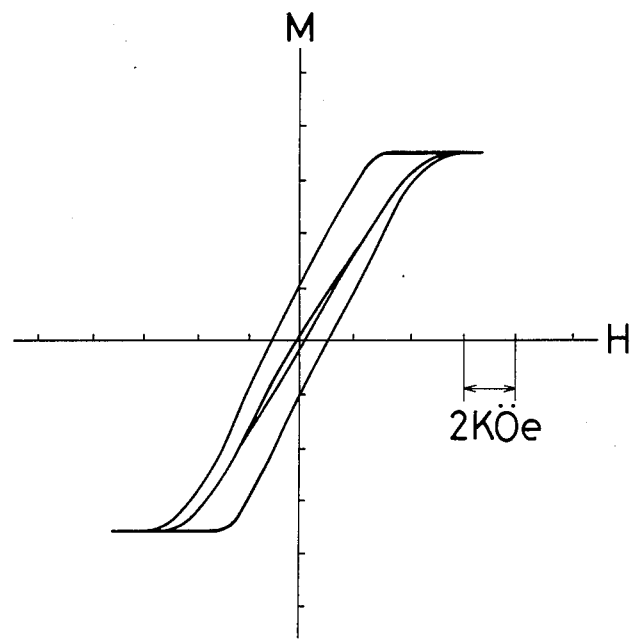

The magnetization curves for the resulting sample magnetic thin films are as shown in FIG. 3 ($Fe_{0.458}O_{0.454}Sn_{0.088}$), FIG. 4 ($Fe_{0.408}O_{0.425}Ge_{0.167}$) and FIG. 6 ($Fe_{0.562}O_{0.438}$) and FIG. 7 ($Fe_{0.509}Al_{0.024}O_{0.467}$).

As apparent from these Figures, it has been found that any magnetic film has a large magnetic anisotropy in the perpendicular direction to the surface thereof and satisfies a requirement:

$$Hk > 4\pi Ms$$

wherein Hk is a perpendicular magnetic anisotropy field and Ms is a saturation magnetization, required as a magnetic characteristic for perpendicularly magnetized film and thus, it is a perpendicularly magnetized film. In addition, it has also been found that the coercive force is of 720 Öe with $Fe_{0.458}O_{0.454}Sn_{0.088}$, 1120 Öe with $Fe_{0.408}O_{0.425}Ge_{0.167}$, 830 Öe with $Fe_{0.562}O_{0.438}$, and 620 Öe with $Fe_{0.509}Al_{0.024}O_{0.467}$, and thus, has an sufficient value for a perpendicular magnetic recording medium, respectively. Further, it has been confirmed that such samples of the magnetic thin films are as large as 300 emu/cc, 290 emu/cc, 240 emu/cc and 190 emu/cc in saturation magnetization and therefore, are an excellent perpendicularly magnetized film, respectively.

In general, the variation in composition is accompanied by the variation in magnetization, but in the present invention, the increase in proportion of oxygen is accompanied by the reduction in magnetization. However, the perpendicular magnetic anisotropy, namely, perpendicular magnetic anysotropy field tends to exhibit a substantially constant value even with the increase in proportion of oxygen. Consequently, it has been found that the value of $Hk/4\pi Ms$ as a peculiar index of perpendicular magnetization performance increases with the reduction in magnetization.

On the other hand, it has also been found that the increase in content of aluminum is accompanied by the decrease in coercive force, but a magnetic thin film comprising only iron oxide with a aluminum content of 0% has a sufficient high coercive force of about 900 Öe and hence, aluminum is an element useful for controlling the coercive force.

In this way, as a result of the repeating of various studies on the basis of the knowledges obtained from the above fundamental experiments, the present invention has been accomplished herein.

In short, the magnetic thin film according to the present invention is an iron-oxygen system magnetic thin film having an excellent magnetic anisotropy in the perpendicular direction to the surface thereof and comprising iron (Fe), oxygen (O) and as a third element, tin (Sn) and/or germanium (Ge) or aluminum (Al).

Figure 2:
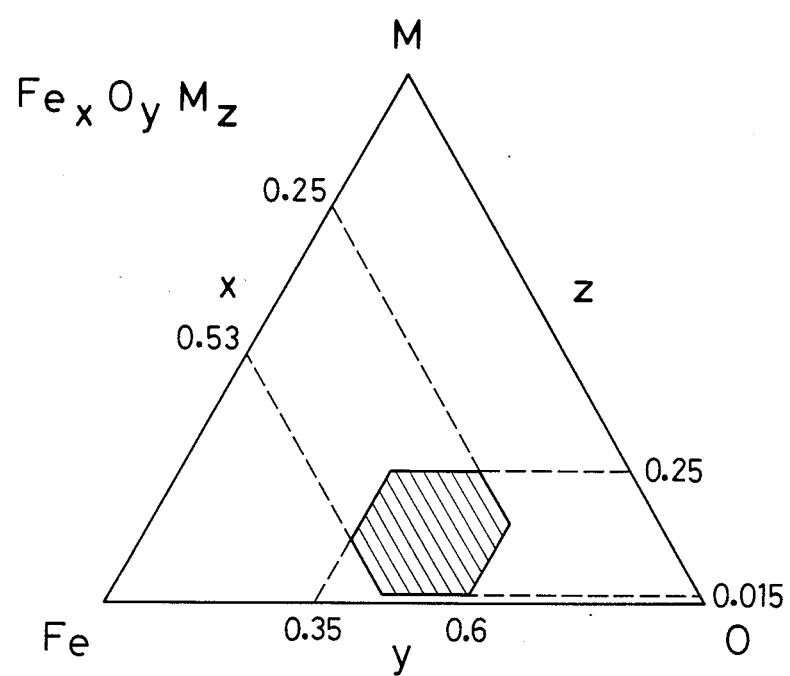
FIG. 2 is a diagram illustrating a range of the composition, of a magnetic thin film according to the present invention, represented by $Fe_xO_yM_z$ (a perpendicular magnetized thin film)

More specifically, the present invention contemplates a perpendicular magnetized anisotropic thin film having a vertical magnetic anisotropy with a perpendicular magnetic anisotropy field of 2.5 kÖe or more and having a composition represented by the formula:

$$Fe_xO_yM_z \tag{I}$$

wherein x, y and z each represent a proportion of each atom, with a proviso that $0.25 \leq x \leq 0.6$, $0.3 \leq Y \leq 0.6$, and $0.005 \leq z \leq 0.3$ (see FIG. 1), or a perpendicularly magnetized thin film having a saturation magnetization of 1 emu/cc or more, and having a composition consisting of Fe, O and M (wherein M is one or two of Sn and Ge) and represented by the formula:

$$Fe_xO_yM_z \tag{I'}$$

wherein x, y and z each represent a proportion of each atom, with a proviso that $0.25 \leq x \leq 0.53$, $0.35 \leq Y \leq 0.6$, and $0.015 \leq z \leq 0.25$ (see FIG. 2)

Description will now be made in more detail of these magnetic thin films comprising iron (Fe), oxygen (O) and M (tin and/or germanium).

Particularly, the latter magnetic thin film of the present invention (see FIG. 2) has excellent perpendicular magnetization characteristics by possessing the above composition, and the principal respects thereof are as follows:

(1) It has a perpendicularly high rectangular magnetization in a magnetization curve on the surface thereof (having an rectangular ratio of 0.9 or more);

(2) It has a larger coercive force (e.g., of from 100 Öe up to 3,000 Öe);

(3) The perpendicular magnetic anisotropy is larger (the perpendicular anisotropic magnetic field is of 11.4 kÖe, for example, at maximum);

(4) The saturated magnetization is larger (having a value of 400 emu/cc, for example, at maximum); and (5) It has a larger value in $Hk/4\pi Ms$ (of 9.2, for example, at maximum).

Thus, the latter magnetic thin film is an ideal material as a perpendicular magnetic recording medium.

It is noted that the reason why the component contents x, y and z in $Fe_xO_yM_z$ are limited to the above ranges respectively is as follows:

When oxygen concentration $y > 0.6$ and iron concentration $x < 0.25$, the saturated magnetization is less than of 1 emu/cc. If the third element concentration $z \leq 0.3$, then the saturation magnetization is of 1 emu/cc or more, or the perpendicular magnetic amisotropy field is of 2.5 kOe or more. When $x \leq 0.6$ and $y \geq 0.3$, the perpendicular anisotropic magnetic field is of 2.5 kOe or more, or the saturation magnetization is of 1 emu/cc or more.

If the ranges of the iron concentration x, the oxygen concentration y and the third element concentration z are respectively as follows: $0.025 \leq x \leq 0.53$, $0.35 \leq y \leq 0.6$ and $0.015 \leq z \leq 0.25$, then a perpendicular magnetized film is provided.

In the present invention, according to the above magnetic characteristics, the ranges for a perpendicular magnetic anisotropy are limited to $0.25 \leq X$, 0.6, $0.3 \leq y \leq 0.6$, and $0.005 \leq z \leq 0.3$. In addition, the ranges of perpendicular magnetization are limited to $0.25 < x < 0.53$, $0.35 < y < 0.6$, and $0.015 < z < 0.25$.

Figure 5:
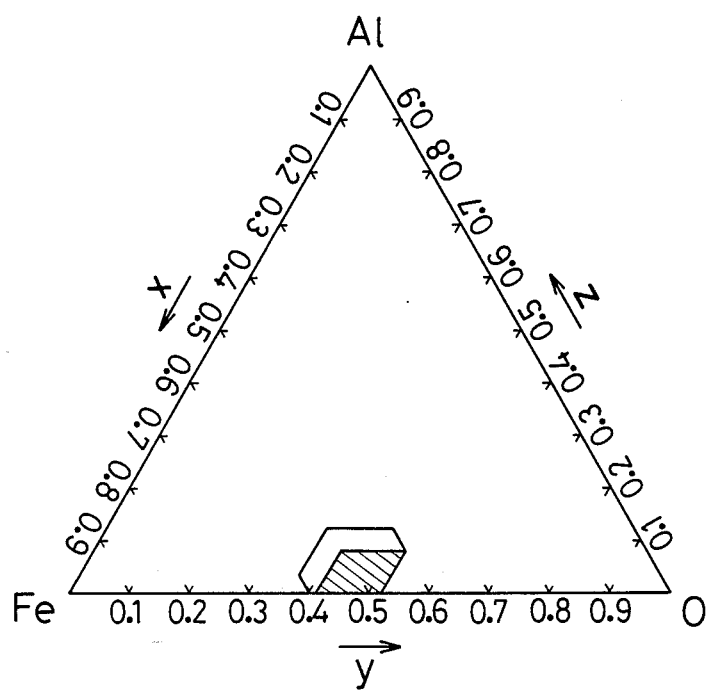
FIG. 5 is a diagram illustrating a range of the composition of a magnetic thin film represented by $Fe_xO_yAl_z$ according to the present invention.

Alternatively, the magnetic thin film according to the present invention may have a composition consisting of Fe, O and Al and represented by the following formula:

$$Fe_xO_yAl_z \qquad (II)$$

wherein x, y and z are a proportion of atom, respectively, with a proviso that $0.4 \leq x \leq 0.6$, $0.38 \leq y \leq 0.52$ and $0 \leq z \leq 0.11$ (see the ranges indicated by the solid lines in FIG. 5), so that it may be a perpendicular magnetized anisotropic thin film having a perpendicular magnetic anisotropy with a perpendicular magnetic anisotropy field of 2 kOe or more. It is also contemplated by the present invention that a perpendicular magnetized thin film or a perpendicular magnetically film having a perpendicular magnetic anisotropy with and anisotropy with an anisotropic magnetic field of 3 kOe or more is provided, particularly by having a composition (see the region indicated by slant lines in FIG. 5) wherein in the above formula, $0.4 \leq x \leq 0.59$, $0.41 \leq y \leq 0.52$ and $0 \leq z \leq 0.08$.

Especially, the aforesaid latter magnetic thin film has an excellent perpendicular magnetic anisotropy or perpendicular magnetization characteristics by possessing the above composition, and the principal respects thereof are as follows:

(1) It has a perpendicularly high rectangular magnetization in a magnetization curve on the surface thereof (having an rectangular ratio of 0.9 or more);

(2) It has a larger coercive force (e.g., of from 100 Oe up to 920 Oe);

(3) The perpendicular magnetic anisotropy is larger (the perpendicular anisotropic magnetic field is of 4 kOe, for example, at maximum); and (4) The saturation magnetization is larger (having a value of 270 emu/cc, for example, at maximum within the scope of perpendicularly magnetized film).

Thus, such magnetic thin film is an ideal material as a perpendicular magnetic recording medium.

It is noted that the reason why the component contents x, y and z in $Fe_xO_yAl_z$ are limited to the above ranges respectively is as follows:

If the iron concentration x, the oxygen concentration y and the aluminum concentration z are respectively as follows: $0.4 \leq x \leq 0.6$, $0.38 \leq y \leq 0.52$ and $0 \leq z \leq 0.11$, the perpendicular magnetic anisotropy field can be of 2 kOe or more. Particularly, when the iron concentration x, the oxygen concentration and the aluminum concentration are within the following ranges: $0.4 \leq x \leq 0.59$, $0.41 \leq y \leq 0.52$ and $0 \leq z \leq 0.08$, a perpendicular magnetically-ansiotropic magnetic thin film or a perpendicularly magnetized film having a further increased perpendicular magnetic anisotropy field of 3 kOe or more.

Therefore, in the present invention, the regions for a perpendicular magnetic anisotropy are limited to $0.4 \leq x \leq 0.6$, $0.38 \leq y \leq 0.52$ and $0 \leq z \leq 0.11$. In addition, the regions for a magnetic thin film having a perpendicular magnetic anisotropy with a perpendicular magnetic anisotropy field of 3 kOe or more, or the regions for a perpendicularly magnetized film having a magnetic anisotropy with a perpendicular magnetic anisotropy field exceeding a demagnetization field depending on the configuration are limited to $0.4 \leq x \leq 0.59$, $0.41 \leq y \leq 0.52$ and $0 \leq z \leq 0.08$.

The present invention will now be described by way of Examples. It should be noted that the examples of the abovedescribed fundamental experiments are, of course, fallen within Examples of the present invention.

EXAMPLES 1 TO 3

Figure 1:
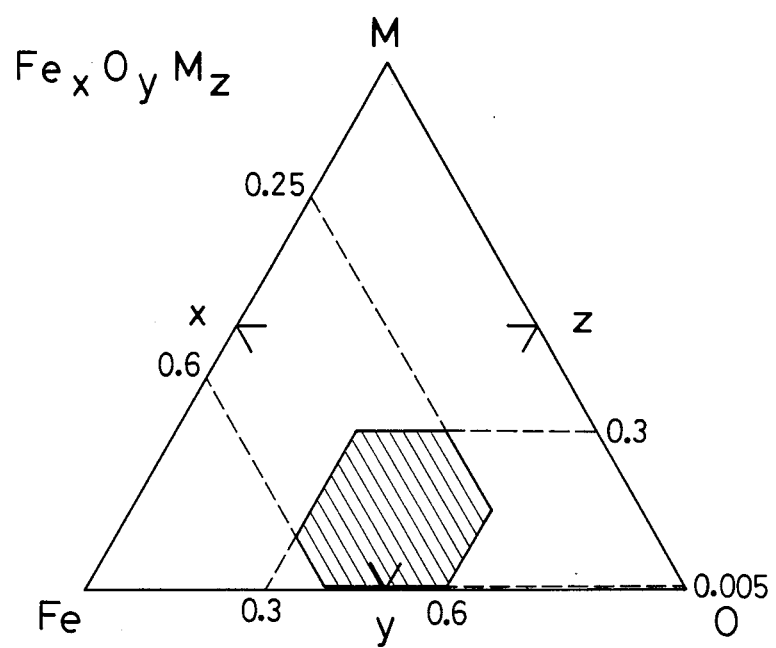
FIG. 1 is a diagram illustrating a range of the composition, of a magnetic thin film according to the present invention, represented by $Fe_xO_yM_z$ (a perpendicular magnetized anisotropic thin film having a perpendicular magnetic anisotropy field of 2.5 kOe or more and a saturated magnetization of 1 emu/cc or more)

Magnetic thin films respectively having compositions of $Fe_xO_ySn_z$, $Fe_xO_yGe_z$ and $Fe_xO_y(Sn_{z1}+Ge_{z2})$ as shown in FIG. 1 were produced in an RF bipolar sputtering process.

In Example 1 wherein the thin film of $Fe_xO_ySn_z$ was produced, a composite target was used which comprises a disk of Fe ($80\phi \times 5t$) and sintered pellets of $SnO_2$ ($10\phi \times 3t$) and $Fe_2O_3$ ($8\phi \times 5t$) placed thereon. In Example 2 wherein the thin film of $Fe_xO_yGe_z$ was produced, a composite target was used which comprises a disk of $Fe_2O_3$ ($80\phi \times 6t$) and sheets of Fe ($5 \times 5 \times 1t$), sheets of Ge ($5 \times 5 \times 1t$) and sintered pellets of $GeO_2$ ($10\phi \times 3t$) respectively placed on the disk. In Example 3 wherein the thin film of $Fe_xO_y(Sn_{z1}+Ge_{z2})$ was produced, use was made of target comprising a disk of $Fe_2O_3$ ($80\phi \times 6t$) and sheets of Fe ($5 \times 5 \times 1t$) and sintered pellets of $GeO_2$ and $SnO_2$ ($10\phi \times 3t$) respectively placed on the disk. In any Example, a substrate of a Pyrex glass was cooled with water and use was made of an argon pressure of 2 Pa, and anode voltage of 1.5 kV (except for Example 2 wherein an anode voltage was of 1.3 kV), an applied magnetic field of 50 Oe and a distance between electrodes of 40 mm.

The magnetic characteristics and the thicknesses of the resulting magnetic thin films are given in Table 1. Those of the magnetic films in Comparative Examples as well as the conventional Co-Cr based thin film are also given in Table 1, wherein in Comparative Example 1, the Fe concentration is out of the range defined in the present invention, and in Comparative Example 2, the 0 concentrations out of range defined in the present invention. It is to be noted that the thin films were produced in Comparative Example 1 under the same conditions as in Example 1 and in Comparative Example 2 under the same conditions as in Example 2.

As apparent from Table 1, any magnetic thin film in Examples of the present invention presents an excellent perpendicular magnetic anisotropy and exhibits characteristics equal to or over those of the conventional Co-Cr based thin films which has hitherto been understood to be excellent. On the contrary, in Comparative Examples wherein the component concentration is out of the range defined in the present invention, a satisfactory perpendicular magnetic anisotropy was not provided. Moreover, it has also been confirmed that the magnetic thin films in Examples of the present invention have a higher electric resistivity (of $\approx 10^{-3}$ Ω cm or more) and a excellent corrosion resistance and mechanical properties.

TABLE 2

|  | Component Composition (wt. %) | Ms [emu/cc] | Hcl [Oe] | Hk [kOe] | Thickness [μm] | Electrode Voltage [KV] |
| --- | --- | --- | --- | --- | --- | --- |
| Example 4 | $Fe_{0.488}O_{0.512}$ | 52 | 130 | 2.2 | 1.7 | 1.3 |
| Example 5 | $Fe_{0.533}O_{0.467}$ | 141 | 640 | 3.5 | 1.8 | 1.9 |
| Example 6 | $Fe_{0.552}O_{0.448}$ | 188 | 800 | 3.5 | 1.8 | 1.7 |
| Example 7 | $Fe_{0.441}Al_{0.075}O_{0.484}$ | 165 | 140 | 2.6 | 1.9 | 1.5 |
| Example 8 | $Fe_{0.479}Al_{0.041}O_{0.48}$ | 169 | 620 | 3.1 | 1.9 | 1.5 |
| Example 9 | $Fe_{0.509}Al_{0.044}O_{0.447}$ | 250 | 800 | 3.1 | 2.5 | 1.8 |
| Example 10 | $Fe_{0.510}Al_{0.015}O_{0.475}$ | 160 | 840 | 3.5 | 1.9 | 1.5 |
| Example 11 | $Fe_{0.595}O_{0.405}$ | 380 | 440 | 2.2 | 1.9 | 1.3 |
| Example 12 | $Fe_{0.438}Al_{0.103}O_{0.459}$ | 436 | 140 | 2.4 | 2.1 | 1.5 |
| Example 13 | $Fe_{0.536}Al_{0.066}O_{0.398}$ | 273 | 260 | 2.2 | 2.7 | 1.3 |
| Comparative Example 3 | $Fe_{0.416}Al_{0.120}O_{0.464}$ | 217 | 140 | 1.9 | 2.6 | 1.3 |
| Comparative Example 4 | $Fe_{0.457}Al_{0.007}O_{0.536}$ | 168 | 480 | 1.2 | 2.3 | 1.3 |
| Comparative Example 5 | $Fe_{0.564}Al_{0.062}O_{0.374}$ | 594 | 220 | 1.8 | 2.4 | 1.3 |
| Prior Art | $Co_{80}Cr_{20}$ | 370 | 800 | 5.0 | 0.95 | — |

TABLE 1

|  | Composition (Proportions of atoms) | Ms [emu/cc] | Hcl [Oe] | Hk [kOe] | Thickness [μm] |
| --- | --- | --- | --- | --- | --- |
| Example 1 | $Fe_{0.354}O_{0.456}Sn_{0.19}$ | 140 | 190 | 2.88 | 1.8 |
| Example 1 | $Fe_{0.424}O_{0.481}Sn_{0.095}$ | 160 | 760 | 5.9 | 1.8 |
| Example 1 | $Fe_{0.459}O_{0.453}Sn_{0.088}$ | 310 | 710 | 4.2 | 1.7 |
| Example 1 | $Fe_{0.55}O_{0.375}Sn_{0.075}$ | 400 | 360 | 3.18 | 1.7 |
| Comparative Example 1 | $Fe_{0.635}O_{0.321}Sn_{0.044}$ | 660 | 380 | 2.0 | 1.6 |
| Example 2 | $Fe_{0.417}O_{0.42}Ge_{0.163}$ | 320 | 1480 | 4.5 | 2.0 |
| Example 2 | $Fe_{0.468}O_{0.466}Ge_{0.066}$ | 230 | 1620 | 4.9 | 0.9 |
| Example 2 | $Fe_{0.479}O_{0.466}Ge_{0.055}$ | 110 | 480 | 3.2 | 1.7 |
| Comparative Example 2 | $Fe_{0.574}O_{0.277}Ge_{0.149}$ | 670 | 160 | 2.3 | 1.5 |
| Example 3 | $Fe_{0.42}O_{0.48}Ge_{0.074}Sn_{0.026}$ | 145 | 160 | 3.5 | 1.6 |
| Prior Art | $Co_{80}Cr_{20}$ | 370 | 800 | 5.0 | 0.95 |

EXAMPLE 4 TO 13

Magnetic thin films each having a composition of $Fe_xO_yAl_z$ as given in Table 2 were produced in an RF sputtering process in the same manner as in Examples 1 to 3. The conditions of production are as follows: Use was made of a composite target comprising a disk of $Fe_2O_3$ (80φ×5t), and sheets of Fe (5×5 1t) and sheets of Al (2.5×2.5×1) both placed on the disk and a composite target comprising a disk of Fe (80φ×5t), and sintered pellets of $Fe_2O_3$ (80φ×5t) and sheets of $Al_2O_3$ (2.5×2.5×1) both placed on the disk. In addition, in these Examples, a substrate of a Pyrex glass was cooled with water, and use was made of an argon pressure of 2 Pa, an anode voltage 1.3 to 1.8 kV, an applied magnetic field of 50 Öe and an electrode-to-electrode distance of 40 mm. The magnetic characteristics and the thicknesses of the resulting magnetic films and the anode voltage during the formation of the films are given in Table 2.

Those of the magnetic films in Comparative Examples as well as the conventional Co-Cr based thin film are also given in Table 2. It should be noted that the magnetic films in Comparative Examples were produced under the same conditions as in these Examples.

As apparent from Table 1, any magnetic thin film in Examples of the present invention presents an excellent perpendicular magnetic anisotropy and exhibits characteristics equal to or over those of the conventional CoOCr based thin film which has hitherto been understood to be excellent. On the contrary, in Comparative Examples wherein the component concentration is out of the range defined in the present invention, a satisfactory perpendicular magnetic anisotropy was not provided.

As discussed above in detail, according to the present invention, an excellent perpendicular magnetic anisotropy is provided by the use of iron-oxygen system, or iron-oxygen system, as a predominant component, containing a third element added thereto. Therefore, any starting material is inexpensive and is above all certainty in supply, and the magnetic thin film of the present invention satisfies the requirements convenient for the mass use as a recording medium. Moreover, the producing procedure is extremely simple and it is unnecessary to increase the temperature of a substrate, and hence, the type of substrate material is particularly not limited.

In addition, the magnetic characteristics are broadly controllable, and it is possible to provide the magnetic thin film of the present invention with excellent characteristics optimum as a perpendicularly magnetized recording medium, thus making it possible to provide a uniform, fine and high density recording on the medium. Further, with the magnetic thin film of the present invention, a higher electric resistivity and a high speed writting can also be assured, and such film is excellent in corrosion resistance and mechanical properties because it is an oxide.

As described above, the magnetic thin film of the present invention has excellent characteristics as a perpendicular magnetic recording medium and is a new material easy to form a film and suitable for industrialization, and thus, the effect thereof is extremely large.

What is claimed is:

1. A magnetic thin film, wherein said film has a magnetic anisotropy in the perpendicular direction to the surface thereof, and said film consists of an iron-oxygen system of the following composition:

$$Fe_xO_yM_z$$

wherein M represents one or both of tin or germanium, and $0.25 \leq x \leq 0.6$,
$0.3 \leq y \leq 0.6$, and
$0.005 \leq z \leq 0.3$.

2. A magnetic film according to claim 1, wherein said thin film is a perpendicularly magnetized anisotropic thin film having the composition (I) wherein $0.25 \leq x \leq 0.53$,
$0.35 \leq y \leq 0.6$ and
$0.015 \leq z \leq 0.25$.

3. A magnetic thin film, wherein said film has a magnetic anisotropy in the perpendicular direction to the surface thereof, and said film consists of an iron-oxygen system of the following composition:

$$Fe_xO_yAl_z$$

wherein:
  $0.4 \leq x \leq 0.6$,
  $0.3 \leq y \leq 0.52$, and
  $0 \leq z \leq 0.11$.

4. A magnetic thin film according to claim 3, wherein:
  $0.4 \leq x \leq 0.59$,
  $0.41 \leq y \leq 0.52$, and
  $0 \leq z \leq 0.08$, and has a magnetic anisotropy with an anisotropic magnetic field of 3 KÖe in the perpendicular direction to the surface thereof.

* * * * *